US011520752B2

(12) United States Patent
Rooney et al.

(10) Patent No.: US 11,520,752 B2
(45) Date of Patent: Dec. 6, 2022

(54) REMOTE CONTROL OF A CHANGE DATA CAPTURE SYSTEM

(71) Applicant: International Business Machines Corporation, Armonk, NY (US)

(72) Inventors: John Rooney, Zurich (CH); Peter Urbanetz, Au (CH)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 16/366,821

(22) Filed: Mar. 27, 2019

(65) Prior Publication Data

US 2020/0311036 A1 Oct. 1, 2020

(51) Int. Cl.
| | |
|---|---|
| *G06F 16/182* | (2019.01) |
| *H04L 67/00* | (2022.01) |
| *G06F 16/22* | (2019.01) |
| *G06F 16/14* | (2019.01) |
| *G06F 16/17* | (2019.01) |
| *G06F 16/25* | (2019.01) |

(52) U.S. Cl.
CPC ........ *G06F 16/1844* (2019.01); *G06F 16/156* (2019.01); *G06F 16/1734* (2019.01); *G06F 16/2272* (2019.01); *G06F 16/252* (2019.01); *H04L 67/34* (2013.01)

(58) Field of Classification Search
CPC ............. G06F 16/1844; G06F 16/2272; G06F 16/156; G06F 16/1734; G06F 16/252; H04L 67/34
See application file for complete search history.

(56) References Cited

U.S. PATENT DOCUMENTS

| | | | |
|---|---|---|---|
| 2012/0150791 A1* | 6/2012 | Willson | G06F 16/254 707/600 |
| 2013/0346364 A1 | 12/2013 | Ahluwalia et al. | |
| 2014/0304229 A1* | 10/2014 | Zhu | G06F 16/27 707/634 |
| 2016/0034547 A1* | 2/2016 | Lerios | G06F 16/283 707/602 |
| 2016/0077926 A1* | 3/2016 | Mutalik | G06F 11/1453 711/162 |
| 2016/0294649 A1* | 10/2016 | Russell | G06F 9/542 |
| 2017/0011087 A1* | 1/2017 | Hyde | G06F 16/254 |
| 2017/0308602 A1 | 10/2017 | Raghunathan et al. | |
| 2018/0081924 A1 | 3/2018 | Johnston | |
| 2019/0102418 A1* | 4/2019 | Vasudevan | G06F 16/2358 |
| 2019/0310891 A1* | 10/2019 | Baldasaro | G06N 20/00 |

* cited by examiner

*Primary Examiner* — Ashish Thomas
*Assistant Examiner* — Yohanes D Kelemework
(74) *Attorney, Agent, or Firm* — Daniel Morris; Otterstedt & Kammer PLLC (57) ABSTRACT

The present disclosure relates to a control system for remotely controlling a change data capture (CDC) system. The CDC system comprises a source computing system and target computing system. The target computing system is configured to store a copy of data of the source computing system. The source computing system and the target computing system are configured to execute coordinated actions using predefined agents in order identify a change to data of the source computing system and to propagate, and store the change to the target computing system. The control system is configured for dynamically installing User-Defined Functions, UDF functions, in the source and target systems in order to control the agents to perform the predefined actions.

21 Claims, 3 Drawing Sheets

REMOTE CONTROL OF A CHANGE DATA CAPTURE SYSTEM

BACKGROUND

The present invention relates to the field of digital computer systems, and more specifically, to a control system for remotely controlling a change data capture (CDC) system.

Many systems exist for moving data from one relational system to another. These systems can be classified into two categories: full refresh systems that copy entire data sets and CDC systems that optimize transfers by applying changes only. CDC systems enable a change data capture service using agents such that only the data in a source system of the CDC system that has actually changed are updated in a target system of the CDC system.

SUMMARY

Various embodiments provide a control system for remotely controlling a CDC system, method and computer program product as described by the subject matter of the independent claims. Advantageous embodiments are described in the dependent claims. Embodiments of the present invention can be freely combined with each other if they are not mutually exclusive.

In one aspect, the invention relates to a control system for remotely controlling a change data capture, CDC, system, the CDC system comprising a source computing system and target computing system, the target computing system being configured to store a copy of data of the source computing system, the source computing system and the target computing system being configured to execute coordinated actions using predefined agents in order identify a change to data of the source computing system and to propagate, and store the change to the target computing system, the control system being configured for installing (or dynamically installing) User-Defined Functions, UDF functions, in the source and target systems in order to control the agents to perform the predefined actions.

In another aspect, the invention relates to a method for remotely controlling a change data capture, CDC, system, the CDC system comprising a source computing system and target computing system, the target computing system being configured to store a copy of data of the source computing system, the source computing system and the target computing system being configured to execute coordinated actions using predefined agents in order identify a change to data of the source computing system and to propagate, and store the change to the target computing system, the method comprising dynamically installing User-Defined Functions, UDF functions, in the source and target systems in order to control the agents to perform the predefined actions.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enable an efficient control of the change data capture service. By reducing user interventions, the present subject matter may enable a systematic and accurate execution of change data capture services. The control system may provide a third party service that can be used by normal users. Instead of requiring resources at both the source and target systems, the present subject matter enables to centralize the computing efforts at one point. Using the control system to control the change data capture processes in the CDC system may minimize the amount of pre-installations and configurations.

The UDF function may, for example, refer to a function. The function may be a sequence of instructions that performs a specific task.

According to one embodiment, the control system is configured to install the UDF functions by: connecting to the source computing system via a predefined interface, installing a portion of the UDF functions in the source computing system, connecting to the target computing system via the predefined interface, installing another portion of the UDF functions in the target computing system, configuring the CDC system by invoking UDF functions in the source and target systems in a predefined order. In one example, the control system may connect to the source computing system before connecting to the target computing system. This may enable to quickly start the change data capture service. In another example, the control system may connect in parallel to the source and target computing systems. This may enable to further speed up the change data capture service. For example, a first UDF function may be invoked for starting a capture agent and for informing the capture agent that a given data or data table of the source computing system is to be monitored for capturing changes. A second UDF function may for example be used to start, upon detecting a change in the data, an agent that would read the changes and transmit them to the target computing system. A third UDF function of the target computing system may for example be used to start an apply agent in the target computing system such that the apply agent can receive the changes and to apply them in a data table of the target computing system.

According to one embodiment, the source computing system comprises a source table of the source computing system, wherein changes made to the source table are stored in a transaction log of the source computing system. The target computing system comprises a target table that stores data of the source table. The control system is configured to use the UDF functions to: cause a first agent of the agents of the source computing system to detect a change in the source table by monitoring and parsing the transaction log, cause the first agent, in response to detecting the change to store the change in a change data table of the source computing system and to determine whether the source table is associated with a target table, in response to determining that the source table is associated with the target table, cause a second agent of the agents of the source computing system to read the change table, transmit the change over a connection between the source and target computing systems to the target computing system, the transmitted change being further indicative of the target table, cause a third agent of the agents of the target computing system to receive the transmitted change, and cause the third agent to identify the target table as being concerned with the received change and to store the received change in the target table. This embodiment may enable a seamless integration of the present subject matter with existing CSC systems. This embodiment may further enable an efficient control of the change data capture service. Using a log-based change data capture service may enable to provide a low impact capture and rapid delivery of changes without impacting the source computing system. This may particularly be advantageous as the databases are usually equipped with transaction logs and thus there is no need for extra resources to implement the transaction logs.

According to one embodiment, the control system is configured to start the first, second and third agents using the UDF functions and following a predefined order and to stop the first agent after determining whether the source table is associated with the target table, to stop the second agent after the transmission of the change, and to stop the third agent after the change is stored in the target table.

According to one embodiment, the control system is configured to start the third agent upon receiving an information indicating that the change is transmitted to the target computing system. According to one embodiment, the information is received from the second agent.

According to one embodiment, the control system is configured to receive a user input indicating that a change occurs in data of the source computing system, and receive a trigger signal from the user for the installing the UDF functions. Using user inputs may enable to start the engines at the right time e.g. instead of leaving the capture agent continuously monitoring the transaction log for changes until a change is occurred, this embodiment may enable to start the capture agent when the change occurs and thus this embodiment may save processing resources.

According to one embodiment, the control system is configured to perform the installation of the UDF functions in case the change is a first change that occurred in the data of the source computing system. For example, the UDF functions may be installed only once and may be configured to start/stop the agents over time e.g. following a predefined schedule. For example, after a detected change is replicated, the UDF functions may stop the agents for a predefined time period and start them again as described above.

According to one embodiment, the predefined actions comprising at least one of: configuration steps, installation of agents and the coordination of the start, stop and synchronization between the agents of the source computing system and the agents of the target computing systems. The synchronization may consist of determining the time at which an agent is to transmit the change and the time at which an apply agent is to start and apply the received changes.

According to one embodiment, the predefined actions further comprising at least one of: catalogue a source data base server of the source computing system into a target database server of the target computing system; catalogue a source data base of the source computing system into a target database of the target computing system; uncatalogue the source data base server into the target database server; uncatalogue the source database into the target database; list all catalogued database servers; list all catalogued databases; start or stop a capture service daemon for capturing data changes; start or stop an apply service daemon (or agent) for propagating the changes to the target computing system; store or update credentials of the source computing system in the target computing system. In database systems, a database in a remote system may be "catalogued" into a local one. This means that, from the point of view of the local system the database looks like a local database.

According to one embodiment, the control system is configured to connect to the source and target computing systems as a system administrator of the source and target computing systems respectively.

According to one embodiment, the predefined interface being an application programming interface, API.

According to one embodiment, invoking the UDF functions is performed by SQL commands.

According to one embodiment, installing the UDF functions comprises loading the UDF functions into the source and target computing systems using SQL commands.

According to one embodiment, the control system is the source and target computing systems support a SQL interface, wherein the UDF functions comprise SQL statements.

These embodiments may enable a seamless integration of the present subject matter with SQL based CDC systems.

Figure 1:
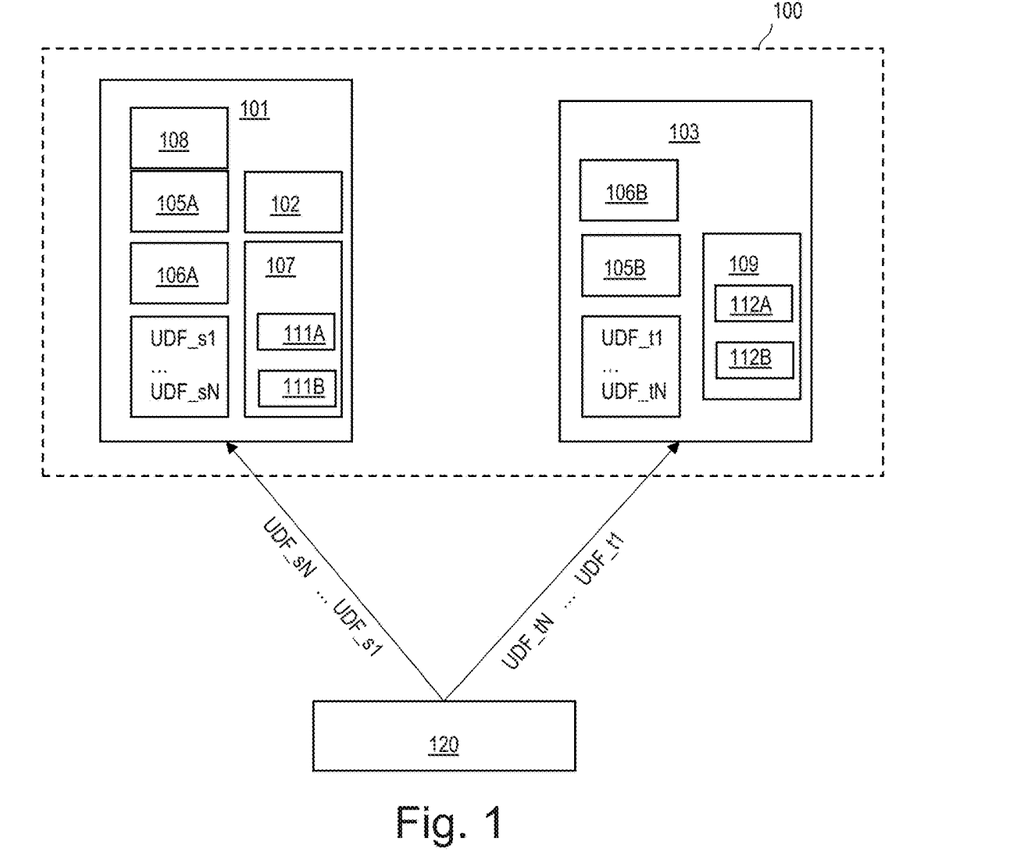
FIG. 1 is a block diagram of a CDC system that is connected to a control system.

FIG. 1 is a block diagram of a CDC system 100 that is connected to a control system 120. In particular, the control system 120 may be configured to connect to a source computing system 101 and target computing system 103 of the CDC system 100. The CDC system 100 may be configured to perform a standard change data capture service or process. For enabling the standard change data capture service, the source and target computing systems 101 and 103 may be provided as follows.

The source computing system 101 may comprise at least one data table 105A. For example, the at least one data table 105A may be part of a database such as DB2 database of the source computing system 101. The target computing system 103 may comprise at least one data table 105B. For example, the at least one data table 105B may be part of a database such as DB2 database of the target computing system 103. The data table 105B may comprise a copy of the data of the data table 105A e.g. as soon as the data table 105A has been created and populated with data, that data is copied or replicated into the data table 105B. However, after that first copying of data, changes (e.g. updates, insertions, deletions etc.) may occur in the data table 105A. In case of such changes, the CDC system 100 is configured to propagate the changes into the data table 105B in accordance with the change data capture service. In this way, the CDC system 100 ensures that only data in the source computing system 101 that has actually changed are updated in the target computing system 103.

The source computing system 101 may comprise one or more source agents 107 for capturing or detecting changes to the data table 105A. An agent may for example be a software component that is configured to perform one or more actions. For example, the source agents 107 may comprise a capture agent 111A that is configured to detect a change in the data table 105 e.g. it identifies which parts of the data table 105A has changed. This capturing may for example be performed by inspecting or scanning a transaction log 108 for change entries. Each entry of the transaction log may indicate which data table the entry is belonging to. The changes that are detected or captured may be stored in a change data table 102 e.g. if a new record is added to the data table 105A, the detected change comprises the new record, and the new record may be stored in the change data table 102. The source agents 107 may further comprise a read agent 111B that is configured to read the change data table 102 and update accordingly a replication table 106A to be replicated to the target computing system 103. The replication table 106A may comprise the change to the data table 105A.

The target computing system 103 may comprise one or more target agents 109 enabling the changes of the data table 105A to be copied into the data table 105B. For example, the target agents 109 may comprise a receiver agent 112A that is configured to receive the replication table 106A. The receiver agent 112A may be configured to communicate directly via TCP/IP with the read agent in order to receive the replication table 106A. The receiver agent 112A may further be configured to store the changed data in replication table 106B of the target computing system 103. The target agents 109 may further comprise an apply agent 112B that is configured to check the replication table 106B for new entries and to update the data table 105B in accordance with the new entries.

The control system 120 may be configured in accordance with the present disclosure to remotely control the standard change data capture service that is provided by the CDC system as described above with reference to FIG. 1. For that, the control system 120 may be configured to connect to the CDC system 100 via a medium of wireline and/or wireless digital data communication, e.g., a communication network. Examples of communication networks include a local area network (LAN), a wide area network (WAN), a wireless local area network (WLAN), all or a portion of the Internet, and/or any other communication system or systems at one or more locations.

For example, the control system 120 may be configured to connect to the source computing system 101 and to the target computing system 103 as a system administrator of the source computing system 101 and the target computing system 103 respectively. The control system 120 may be configured to configure and coordinate the execution of the agents 107 and 109 in order to coordinate the change data capture on both the source and target computing systems. For example, the control system 120 may configure the agents 107 and 109 to perform the change data capture service for a specific table of the source computing system 101 e.g. this may be performed in response to receiving by the control system 120 a request to perform the change data capture service for the specific table. In another example, the control system 120 may automatically trigger or control the change data capture service for a specific table in response to determining that the specific table is being newly stored in the source computing system 101 e.g. the control system 120 may be configured to receive (e.g. automatically) information of data being stored in the source computing system 101.

As illustrated in FIG. 1, the control system 120 is configured to load and install one or more UDF functions UDF_s1 to UDF_sN to the source computing system 101. The control system 120 is further configured to load and install one or more UDF functions UDF_t1 to UDF_tN to the target computing system 103. The UDF functions UDF_s1 to UDF_sN may be used to control the execution of the agents 107 in the source computing system 101. The UDF functions UDF_t1 to UDF_tN may be used to control the execution of the agents 109 in the target computing system 103.

Both the source and target computing systems may support a SQL interface and operations that the control system 120 needs to enact may be built as SQL commands. Each of the SQL commands may be backed by a UDF function that can then implement the necessary action, e.g. start the capture agent, resynchronize, change the capture frequency, add a new table to capture etc. The UDF functions may, for example, be loaded into the source and target computing systems using SQL commands. Using the control system 120 to control the change data capture processes in the CDC system may minimize the amount of pre-installation/configuration.

Figure 2:
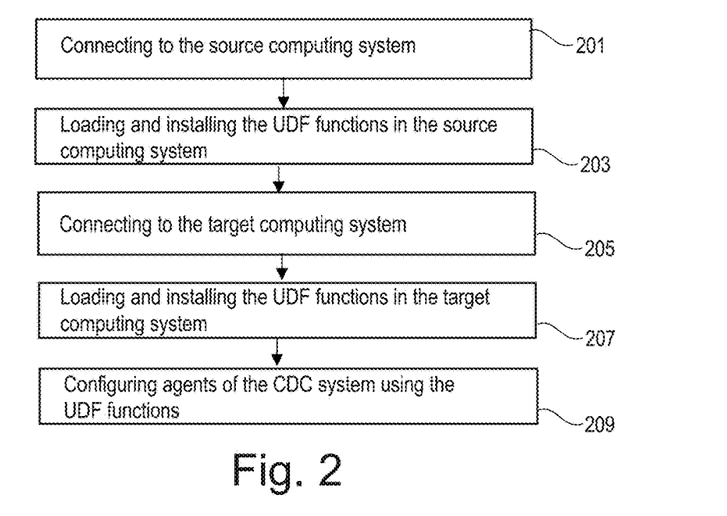
FIG. 2 is a flowchart of a method for loading and installing UDF functions into a CDC system.

FIG. 2 is a flowchart of a method for loading and installing UDF functions into the CDC system 100. The following is an example UDF function that catalogues a remote database (nodeName) on a remote host into a local system. It invokes a C function called catalogNode in order to do this.

CREATE FUNCTION COEDLMOTION.DBCATALOG (nodeName VARCHAR(8), remoteHost VARCHAR(256), serverPort INTEGER, security VARCHAR(3))
    RETURNS CLOB(100K)
    SPECIFIC dbCatalogNode
    EXTERNAL NAME 'coedlmotion!catalogNode'
    LANGUAGE C
    PARAMETER STYLE SQL
    DETERMINISTIC
    NOT FENCED
    RETURNS NULL ON NULL INPUT
    NO SQL
    NO EXTERNAL ACTION
    NO SCRATCHPAD
    ALLOW PARALLEL
    NO FINAL CALL.

In step 201, the control system 120 may connect to the source computing system 101 via a predefined interface. The predefined interface may for example be a JDBC interface. The control system 120 may connect to the source computing system 101 as a system administrator of the source computing system 101. In this way, the control system 120 may configure the operation of the source computing system using administrator privileges. For example, for each agent of the agents 107 that the control system 120 needs access to, an agent/ID mapping may be created. The mapping specifies that the control system 120 is allowed to interact with the agents 107 as an administrator. The mapping may be used by the source computing system to enable the administrator privileges to the control system 120.

After connecting to the source computing system 101, the control system 120 may load and install in step 203 the UDF functions UDF_s1-UDF_sN in the source computing system 101. The loading of the UDF functions UDF_s1-UDF_sN may, for example, be performed by executing a SQL command at the control system 120. The loaded UDF functions may for example configure the agents 107 to perform actions in accordance with the change data capture service again a specific table. For example, a UDF function may trigger the execution of the capture agent against the specific table. The read agent may be started by the same UDF function or by another UDF function in order to perform the reading and replication of the changes as described above.

In step 205, the control system 120 may connect to the target computing system 101 via a predefined interface. The interface may for example be a JDBC interface. The control system 120 may connect to the target computing system 101 as a system administrator of the target computing system 101. In this way, the control system 120 may configure the operation of the target computing system using administrator privileges. For example, for each agent of the agents 109 that the control system 120 needs access to, an agent/ID mapping may be created. The mapping specifies that the control system is allowed to interact with the agents 109 as an administrator. The mapping may be used by the target computing system to enable the administrator privileges to the control system 120.

After connecting to the target computing system 101, the control system 120 may load and install in step 207 the UDF functions UDF_t1-UDF_tN in the target computing system 101. The loading of the UDF functions UDF_t1-UDF_tN may, for example, be performed by executing a SQL command at the control system 120.

After installing the UDF functions in the source and target computing systems, the control system 120 may configure in step 209 agents of the CDC system by invoking the installed UDF functions in the source and target systems in a predefined order e.g. as described with reference to FIG. 3A. For example, the control system 120 may configure the agents in order to enable the change capture service on the source/target systems using SQL e.g. start or stop the change capture service using SQL.

Figure 3A:
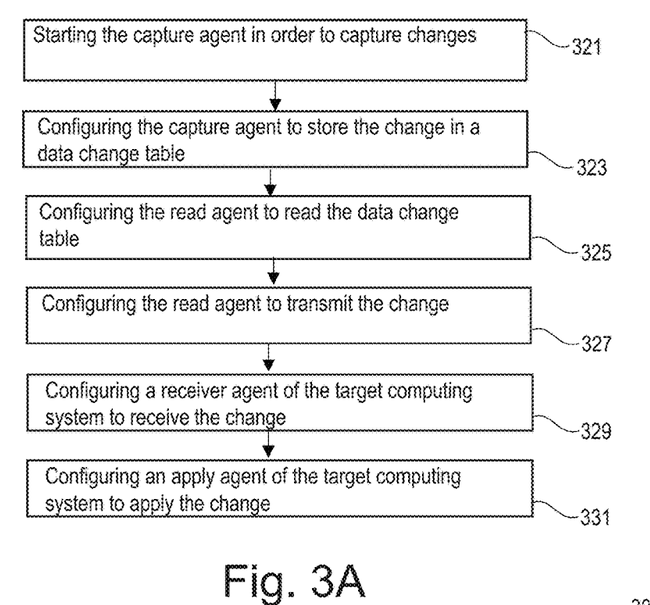
FIG. 3A is a flowchart of a method for configuring the operation of agents of a CDC system.
Figure 3B:
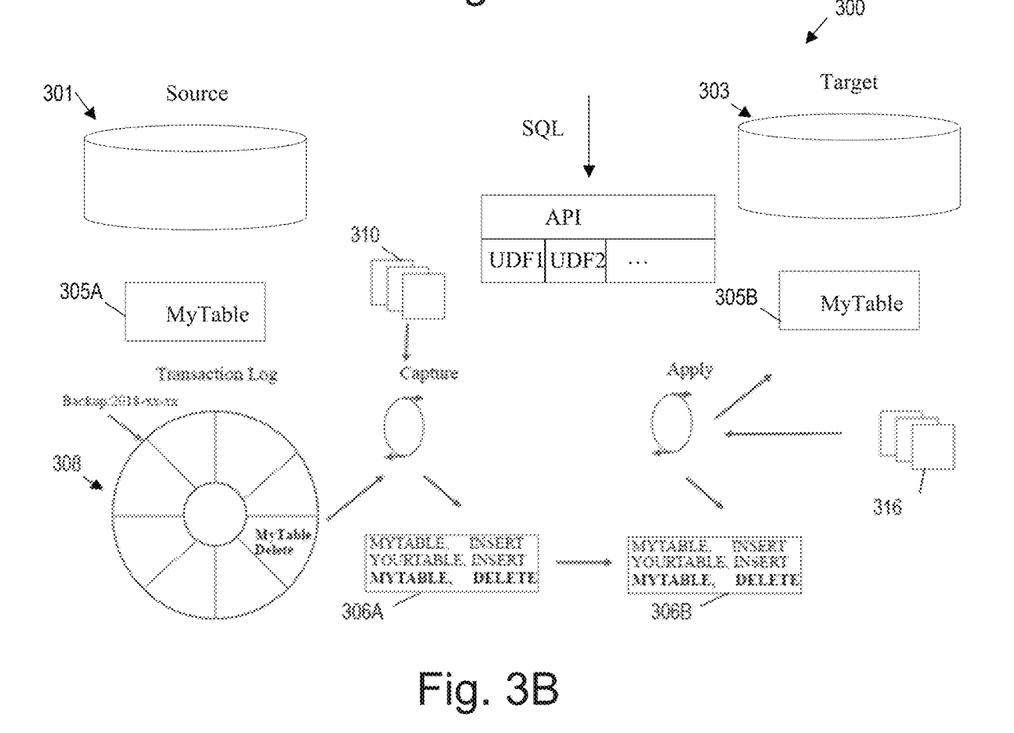
FIG. 3B is a block diagram of a CDC system.

FIG. 3A is a flowchart of a method for configuring the operation of agents of a CDC system 300 of FIG. 3B in order to enable the change data capture service. For clarification purpose, FIG. 3A is described with reference to elements of FIG. 3B.

In step 321, the capture agent of the CDC system 300 may be triggered or started in order to detect a change in the data table 305A by monitoring and parsing the transaction log 308. For example, the capture agent may be configured to regularly check the content of the transaction log 308 for determining if a new entry is added and if that entry is a change of the data table 305A. Using a log-based change data capture service may enable to provide a low impact capture and rapid delivery of changes without impacting the source computing system e.g. as the transaction log is usually provided with databases. The capture agent may directly or might use an API to read data from the transaction log. For example, the capture agent may capture changes by asynchronously reading from the transaction log 308. As exemplified in FIG. 3B a delete operation has been occurred in the data table 305A. This operation is logged in the transaction log 308. By reading the transaction log 308, the capture agent may identify the entry that indicates this new delete operation. The capture agent may determine that the delete operation is a new one because it occurred after the time of last backup 2018-xx-xx as indicated in FIG. 3B.

In response to detecting the change, the capture agent may be configured or controlled to store in step 323 the change in a change data table 310 of the source computing system 301. For example, upon reading data from the transaction log 308, the capture agent may filter data based on the table where the change occurred. And data pertaining to data table 305A is retained for further processing. The capture agent may then stage the changes of the data table 305A in a holding area comprising the change table 310 until a commit of these changes occurs in the data table 305A. The capture agent 323 may further determine in step 323 whether the data table 305A is associated with a target table 305B in the target computing system 303 e.g. this is equivalent to determine by the capture agent may determine that the data table 305A is to be processed in accordance with the change data capture service which implies the existence of a corresponding target table in the target computing system.

A read agent of the source computing system 301 may be configured to read the change table 310 in step 325. This reading may for example automatically be performed after a commit of the changes occurs in the data table 305A. The read agent may update accordingly a replication table 306A to be replicated to the target computing system 103. As indicated in FIG. 3B, the replication table 306A may comprise the delete operation entry to the data table 305A. The read agent may be configured to transmit in step 327 the change over a connection (e.g. via TCP/IP) between the source and target computing systems to the target computing system. This may for example be performed by sending the replication table 306A containing the changes using a predefined process or an engine of the source computing system 301. This may help to reduce processing overheads and network traffic by only sending the data that has changed.

A receiver agent of the target computing system 303 may be configured to receive in step 329 the transmitted change from the read agent. The receiving of the changes may for example be performed using a process or an engine of the target computing system 303. The changes may be received as a replication table 306B. The content of the replication table 306B may temporarily be stored in change data tables 316. An apply agent of the target computing system 303 may be configured to identify, in step 331, the target table 305B as being concerned with the received changes of the change data table 316 and to store the received change in the target table 305B. As illustrated in FIG. 3B, UDF functions are loaded into the CDC system 300 using an API. The UDF functions may be used to configure the agents as described herein.

Figure 4:
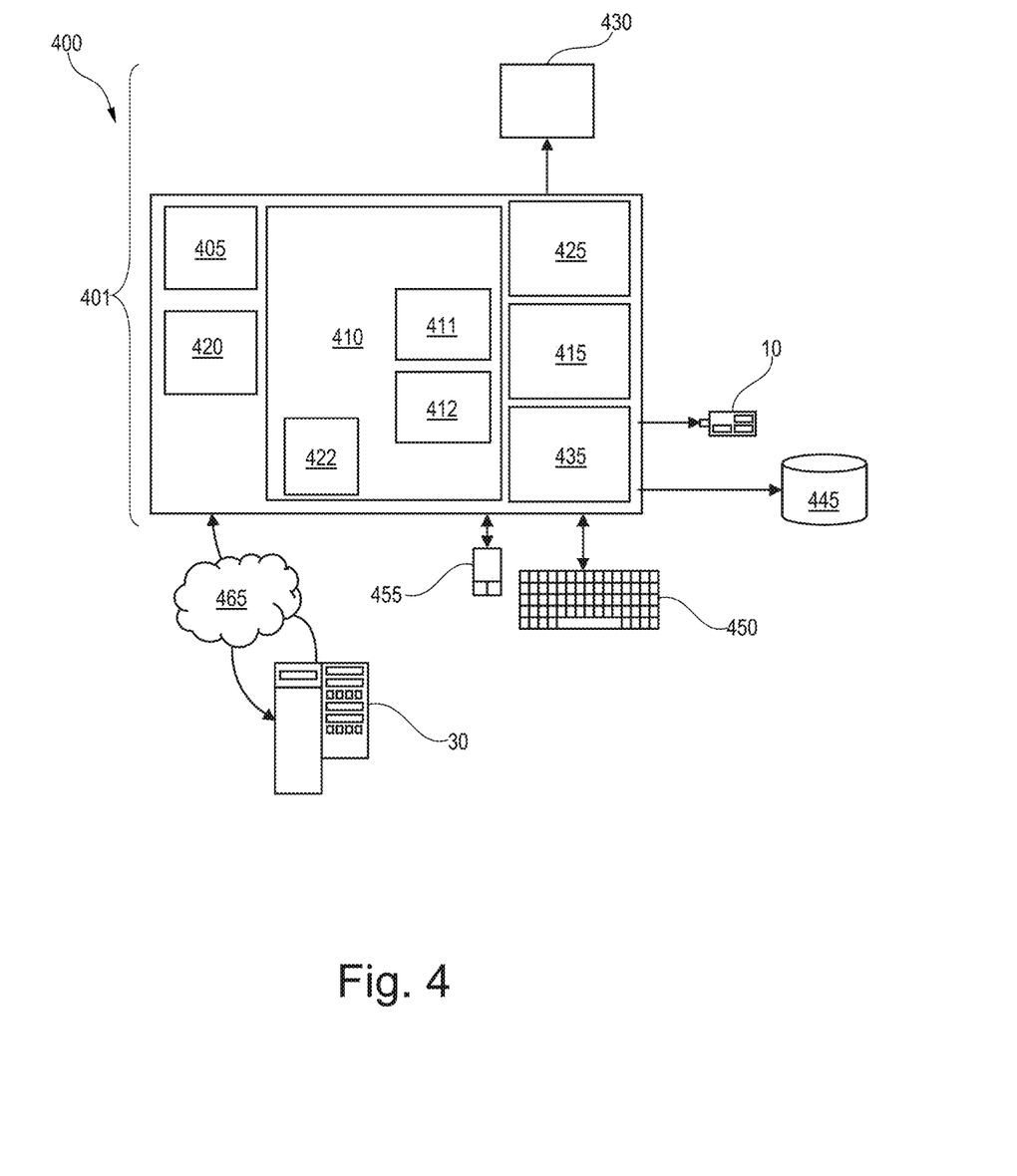
FIG. 4 represents a computerized system, suited for implementing one or more method steps as involved in the present disclosure.

FIG. 4 represents a general computerized system 400 such as control system 120 suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 412, 422 (including firmware 422), hardware (processor) 405, or a combination thereof. In exemplary embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In exemplary embodiments, in terms of hardware architecture, as shown in FIG. 4, the computer 401 includes a processor 405, memory (main memory) 110 coupled to a memory controller 415, and one or more input and/or output (I/O) devices (or peripherals) 10, 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this invention. In the example of FIG. 4, software in the memory 410 includes instructions 412 e.g. instructions to manage databases such as a database management system.

The software in memory 410 shall also typically include a suitable operating system (OS) 111. The OS 411 essentially controls the execution of other computer programs, such as possibly software 412 for implementing methods as described herein.

The methods described herein may be in the form of a source program 412, executable program 412 (object code), script, or any other entity comprising a set of instructions 412 to be performed. When a source program, then the program needs to be translated via a compiler, assembler, interpreter, or the like, which may or may not be included within the memory 410, so as to operate properly in connection with the OS 411. Furthermore, the methods can be written as an object oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include a basic input output system (BIOS) 422. The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software 412, as is shown in FIG. 4, the methods can be stored on any computer readable medium, such as storage 420, for use by or in connection with any computer related system or method. The storage 420 may comprise a disk storage such as HDD storage.

Various embodiments are specified in the following numbered clauses.

1. A control system for remotely controlling a change data capture, CDC, system, the CDC system comprising a source computing system and target computing system, the target computing system being configured to store a copy of data of the source computing system, the source computing system and the target computing system being configured to execute coordinated actions using predefined agents in order identify a change to data of the source computing system and to propagate, and store the change to the target computing system, the control system being configured for dynamically installing UDF functions in the source and target systems in order to control the agents to perform the predefined actions.

2. The control system of clause 1, being configured to install the UDF functions by: connecting to the source computing system via a predefined interface; installing a portion of the UDF functions in the source computing system; connecting to the target computing system via the predefined interface; installing another portion of the UDF functions in the target computing system; configuring the CDC system by invoking UDF functions in the source and target systems in a predefined order.

3. The control system of any of the preceding clauses, the source computing system comprising a source table of the source computing system, wherein changes made to the first source table are stored in a transaction log of the source computing system; the target computing system comprising a target table that stores data of the source table, the control system being configured to use the UDF functions to:

cause a first agent of the agents of the source computing system to detect a change in the source table by monitoring and parsing the transaction log;

cause the first agent, in response to detecting the change to store the change in a change data table of the source computing system and to determine whether the source table is associated with a target table;

in response to determining that the source table is associated with the target table, cause a second agent of the agents of the source computing system to read the change table, transmit the change over a connection between the source and target computing systems to the target computing system, the transmitted change being further indicative of the target table;

cause a third agent of the agents of the target computing system to receive the transmitted change;

cause the third agent to identify the target table as being concerned with the received change and to store the received change in the target table.

4. The control system of clause 3, being configured to start the first, second and third agents using the UDF functions and following a predefined order and to stop the first agent after determining whether the source table is associated with the target table, to stop the second agent after the transmission of the change, and to stop the third agent after the change is stored in the target table.

5. The control system of clause 4, being configured to start the third agent upon receiving an information indicating that the change is transmitted to the target computing system.

6. The control system of clause 5, the information being received from the second agent.

7. The control system of any of the preceding clauses, being configured to receive a user input indicating that a change is occurred in data of the source computing system, and receive a trigger signal from the user for the installing the UDF functions.

8. The control system of any of the preceding clauses, being configured to perform the installation of the UDF functions in case the change is a first change that occurred in the data of the source computing system.

9. The control system of any of the preceding clauses, the predefined actions comprising at least one of: configuration steps, installation of agents and the coordination of the start, stop and synchronization between the agents of the source computing system and the agents of the target computing systems.

10. The control system of clause 9, the predefined actions further comprising at least one of: catalog a source data base server of the source computing system into a target database server of the target computing system; catalog a source data base of the source computing system into a target database of the target computing system; uncatalog the source data base server into the target database server; uncatalog the source database into the target database; list all catalogued database servers; list all catalogued databases; start or stop a capture service daemon for capturing data changes; start or stop an apply service daemon for propagating the changes to the target computing system; store or update credentials of the source computing system in the target computing system.

11. The control system of any of the preceding clauses 2-10, being configured to connect to the source and target computing systems as a system administrator of the source and target computing systems respectively.

12. The control system of any of the preceding clauses 2-11, the predefined interface being an application programming interface, API.

13. The control system of any of the preceding clauses 2-12, wherein invoking the UDF functions is performed by SQL commands.

14. The control system of any of the preceding clauses, wherein installing the UDF functions comprises loading the UDF functions into the source and target computing systems using SQL commands.

15. The control system of any of the preceding clauses, the source and target computing systems supporting a SQL interface, wherein the UDF functions comprise SQL statements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A control system for remotely controlling a change data capture (CDC) system, the change data capture (CDC) system comprising a source computing system, the source computing system comprising at least one source processor and a source memory coupled to the at least one source processor, and a target computing system, the target computing system comprising at least one target processor and a target memory coupled to the at least one target processor, the target computing system being configured to store a copy of data of the source computing system, the source computing system and the target computing system being configured to execute coordinated actions using predefined agents in order identify a change to data of the source computing system and to propagate, and store the change to the target computing system, the control system being configured to install a first agent of the source computing system for detecting a change in a source table by monitoring and parsing a transaction log; install a second agent for reading a change table; install a third agent of the target computing system for receiving a transmitted change; and dynamically install User-Defined Functions (UDF functions) in the source and target systems in order to control the agents to perform the coordinated actions.

2. The control system of claim 1, being configured to install the User-Defined Functions (UDF functions) by: connecting to the source computing system via a predefined interface; installing a portion of the User-Defined Functions (UDF functions) in the source computing system; connecting to the target computing system via the predefined interface; installing another portion of the User-Defined Functions (UDF functions) in the target computing system; configuring the change data capture (CDC) system by invoking User-Defined Functions (UDF functions) in the source and target systems in a predefined order.

3. The control system of claim 1, wherein the source computing system comprises the source table of the source computing system, wherein changes made to the source table are stored in the transaction log of the source computing system; the target computing system comprising a target table that stores data of the source table, the control system being configured to use the User-Defined Functions (UDF functions) to:
  cause the first agent of the agents of the source computing system to detect the change in the source table by monitoring and parsing the transaction log;
  cause the first agent, in response to detecting the change, to store the change in the change data table of the source computing system and to determine whether the source table is associated with the target table;
  in response to determining that the source table is associated with the target table, cause the second agent of the agents of the source computing system to read the change table, transmit the change over a connection between the source and target computing systems to the target computing system, the transmitted change being further indicative of the target table;

cause the third agent of the agents of the target computing system to receive the transmitted change;

cause the third agent to identify the target table as being concerned with the received change and to store the received change in the target table.

4. The control system of claim 3, being configured to start the first, second and third agents using the User-Defined Functions (UDF functions) and following a predefined order and to stop the first agent after determining whether the source table is associated with the target table, to stop the second agent after the transmission of the change, and to stop the third agent after the change is stored in the target table.

5. The control system of claim 4, being configured to start the third agent upon receiving an information indicating that the change is transmitted to the target computing system.

6. The control system of claim 5, the information being received from the second agent.

7. The control system of claim 1, being configured to receive a user input indicating that a change is occurred in data of the source computing system, and receive a trigger signal from the user for the installing the User-Defined Functions (UDF functions).

8. The control system of claim 1, being configured to perform the installation of the User-Defined Functions (UDF functions) in case the change is a first change that occurred in the data of the source computing system.

9. The control system of claim 1, the coordinated actions comprising at least one of: configuration steps, installation of agents and coordination of start, stop and synchronization between the agents of the source computing system and the agents of the target computing systems.

10. The control system of claim 9, the coordinated actions further comprising at least one of:
catalog a source database server of the source computing system into a target database server of the target computing system;
catalog a source database of the source computing system into a target database of the target computing system;
uncatalog the source database server into the target database server;
uncatalog the source database into the target database;
list all catalogued database servers;
list all catalogued databases;
start or stop a capture service daemon for capturing data changes;
start or stop an apply service daemon for propagating the changes to the target computing system; and
store or update credentials of the source computing system in the target computing system.

11. The control system of claim 1, being configured to install the User-Defined Functions (UDF functions) by: connecting to the source computing system via a predefined interface; installing a portion of the User-Defined Functions (UDF functions) in the source computing system; connecting to the target computing system via the predefined interface; installing another portion of the User-Defined Functions (UDF functions) in the target computing system; configuring the change data capture (CDC) system by invoking User-Defined Functions (UDF functions) in the source and target systems in a predefined order, being further configured to connect to the source and target computing systems as a system administrator of the source and target computing systems respectively.

12. The control system of claim 1, being configured to install the User-Defined Functions (UDF functions) by: connecting to the source computing system via a predefined interface; installing a portion of the User-Defined Functions (UDF functions) in the source computing system; connecting to the target computing system via the predefined interface; installing another portion of the User-Defined Functions (UDF functions) in the target computing system; configuring the change data capture (CDC) system by invoking User-Defined Functions (UDF functions) in the source and target systems in a predefined order, the predefined interface being an application programming interface (API).

13. The control system of claim 1, being configured to install the User-Defined Functions (UDF functions) by: connecting to the source computing system via a predefined interface; installing a portion of the User-Defined Functions (UDF functions) in the source computing system; connecting to the target computing system via the predefined interface; installing another portion of the User-Defined Functions (UDF functions) in the target computing system; configuring the change data capture (CDC) system by invoking User-Defined Functions (UDF functions) in the source and target systems in a predefined order, wherein invoking the User-Defined Functions (UDF functions) is performed by SQL commands.

14. The control system of claim 1, wherein installing the User-Defined Functions (UDF functions) comprises loading the User-Defined Functions (UDF functions) into the source and target computing systems using SQL commands.

15. The control system of claim 1, the source and target computing systems supporting a SQL interface, wherein the User-Defined Functions (UDF functions) comprise SQL statements.

16. A method for remotely controlling a change data capture (CDC) system, the change data capture (CDC) system comprising a source computing system, the source computing system comprising at least one source processor and a source memory coupled to the at least one source processor, and a target computing system, the target computing system comprising at least one target processor and a target memory coupled to the at least one target processor, the target computing system being configured to store a copy of data of the source computing system, the source computing system and the target computing system being configured to execute coordinated actions using predefined agents in order identify a change to data of the source computing system and to propagate, and store the change to the target computing system, the method comprising:
installing a first agent of the source computing system for detecting a change in a source table by monitoring and parsing a transaction log;
installing a second agent for reading a change table;
installing a third agent of the target computing system for receiving a transmitted change; and
dynamically installing User-Defined Functions (UDF functions) in the source and target systems in order to control the first agent, the second agent, and the third agent to perform the coordinated actions.

17. The method of claim 16, further comprising automatically detecting a change in data of the source computing system, wherein the installing of the User-Defined Functions (UDF functions) is performed in response to detecting the change.

18. The method of claim 17, further comprising automatically parsing the transaction log of the source computing system, for detecting the change, in accordance with a predefined capture frequency.

19. The method of claim 18, wherein the source computing system comprises the source table of the source computing system, wherein changes made to the first source table are stored in the transaction log of the source computing system; the target computing system comprising a target table that stores data of the source table, the method comprising: using the User-Defined Functions (UDF functions) for:
  causing the first agent of the source computing system to detect the change in the source table by monitoring and parsing the transaction log;
  causing the first agent, in response to detecting the change, to store the change in a change table of the source computing system and to determine whether the source table is associated with the target table;
  in response to determining that the source table is associated with the target table, causing a second agent to read the change table, transmit the change over a connection between the source and target computing systems to the target computing system, the transmitted change being further indicative of the target table;
  causing a third agent of the target computing system to receive the transmitted change;
  causing the third agent to identify the target table as being concerned with the received change and to store the received change in the target table.

20. The method of claim 19, further comprising: starting the first, second and third agents using the User-Defined Functions (UDF functions) and following a predefined order and stopping the first agent after determining whether the source table is associated with the target table, stopping the second agent after the transmission of the change, and stopping the third agent after the change is stored in the target table.

21. A computer program product comprising a computer-readable storage medium having computer-readable program code embodied therewith, the computer-readable program code configured to remotely control a change data capture (CDC) system, the change data capture (CDC) system comprising a source computing system, the source computing system comprising at least one source processor and a source memory coupled to the at least one source processor, and a target computing system, the target computing system comprising at least one target processor and a target memory coupled to the at least one target processor, the target computing system being configured to store a copy of data of the source computing system, the source computing system and the target computing system being configured to execute coordinated actions using predefined agents in order identify a change to data of the source computing system and to propagate, and store the change to the target computing system, the computer-readable program code configured to install a first agent of the source computing system for detecting a change in the source table by monitoring and parsing a transaction log; install a second agent for reading a change table; install a third agent of the target computing system for receiving a transmitted change; and dynamically install User-Defined Functions (UDF functions) in the source and target systems in order to control the agents to perform the coordinated actions.

* * * * *